(12) United States Patent
Kato

(10) Patent No.: US 11,330,148 B2
(45) Date of Patent: May 10, 2022

(54) IMAGE PROCESSING FOR CONVERTING MULTI-SPECTRAL IMAGE BY CALCULATING THE INNER PRODUCT OF THE SPECTRAL DISTRIBUTION OF EACH PIXEL AND THE RESPECTIVE REFERENCE VECTOR

(71) Applicant: OMRON Corporation, Kyoto (JP)

(72) Inventor: Yutaka Kato, Kyotanabe (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/053,788

(22) PCT Filed: May 22, 2019

(86) PCT No.: PCT/JP2019/020287
§ 371 (c)(1),
(2) Date: Nov. 8, 2020

(87) PCT Pub. No.: WO2019/239831
PCT Pub. Date: Dec. 19, 2019

(65) Prior Publication Data
US 2021/0281713 A1  Sep. 9, 2021

(30) Foreign Application Priority Data

Jun. 12, 2018 (JP) .............................. JP2018-112148

(51) Int. Cl.
*H04N 1/54* (2006.01)
*G06T 7/90* (2017.01)
(Continued)

(52) U.S. Cl.
CPC ............... *H04N 1/54* (2013.01); *G06K 9/628* (2013.01); *G06T 7/90* (2017.01); *H04N 1/603* (2013.01); *H04N 9/045* (2013.01)

(58) Field of Classification Search
CPC .......... H04N 1/54; H04N 1/603; H04N 9/045; H04N 1/60; G06K 9/628; G06T 7/90
See application file for complete search history.

(56) References Cited

U.S. PATENT DOCUMENTS

| 2009/0102943 A1* | 4/2009 | Hattori | .................. H04N 9/735 |
| | | | 348/223.1 |
| 2011/0026256 A1* | 2/2011 | Szolyga | ................ G06F 1/1684 |
| | | | 362/253 |
| 2012/0044394 A1* | 2/2012 | Komiya | ............... H04N 9/0451 |
| | | | 348/266 |

FOREIGN PATENT DOCUMENTS

| JP | 2001251645 | 9/2001 |
| JP | 2002262305 | 9/2002 |

(Continued)

OTHER PUBLICATIONS

"International Search Report (Form PCT/ISA/210) of PCT/JP2019/020287", dated Jun. 25, 2019, with English translation thereof, pp. 1-4.

(Continued)

*Primary Examiner* — Christopher Wait
(74) *Attorney, Agent, or Firm* — JCIPRNET

(57) ABSTRACT

Provided is an image processing device which has: an image input part configured to input a multi-spectral image which includes N (N is an integer of 4 or more) channels corresponding to N bands; a reference vector setting part configured to cause a user to set, as three reference vectors, three types of N-dimensional vectors having sensitivities of the respective N bands as elements; and a conversion part configured to convert the multi-spectral image into a 3-channel image including three channels by decomposing a spectral distribution of each pixel of the multi-spectral image on the basis of the three reference vectors.

19 Claims, 14 Drawing Sheets

(51) Int. Cl.
*G06K 9/62* (2022.01)
*H04N 1/60* (2006.01)
*H04N 9/04* (2006.01)

(56) References Cited

FOREIGN PATENT DOCUMENTS

| | | |
|---|---|---|
| JP | 2004077143 | 3/2004 |
| JP | 2009105576 | 5/2009 |
| JP | 2012044519 | 3/2012 |
| JP | 2018009988 | 1/2018 |
| WO | 2016152900 | 9/2016 |
| WO | 2018047171 | 3/2018 |

OTHER PUBLICATIONS

"Written Opinion of the International Searching Authority (Form PCT/ISA/237) of PCT/JP2019/020287", dated Jun. 25, 2019, with English translation thereof, pp. 1-8.
"Office Action of Japan Counterpart Application", dated Nov. 2, 2021, with English translation thereof, pp. 1-8.

* cited by examiner

IMAGE PROCESSING FOR CONVERTING MULTI-SPECTRAL IMAGE BY CALCULATING THE INNER PRODUCT OF THE SPECTRAL DISTRIBUTION OF EACH PIXEL AND THE RESPECTIVE REFERENCE VECTOR

CROSS-REFERENCE TO RELATED APPLICATION

This application is a 371 application of the International PCT application serial no. PCT/JP2019/020287, filed on May 22, 2019, which claims the priority benefit of Japan Patent Application No. 2018-112148, filed on Jun. 12, 2018. The entirety of each of the abovementioned patent applications is hereby incorporated by reference herein and made a part of this specification.

BACKGROUND

Technical Field

Embodiments of the present invention relate to a technique for converting a multi-spectral image.

Related Art

A technique is known which is capable of recording spectral information of a subject with a wavelength resolution higher than that of a common RGB camera. The technique of this type is called "multispectral imaging". A device capable of performing multispectral imaging is called a "multispectral camera", and the obtained image data is called a "multi-spectral image" or the like. In addition, in multispectral imaging, an image in a wavelength region (for example, a near infrared region, an ultraviolet region, or the like) wider than that of a common RGB camera is also recorded. Moreover, a spectrum having up to about a dozen bands may be referred to as a "multispectrum", and a spectrum having a larger number of bands may be referred to as a "hyperspectrum" for distinguishment. However, in the present specification, the multispectrum and the hyperspectrum are not particularly distinguished, and the term "multispectrum" is used to mean "spectrum having four or more bands".

Multi-spectral images can capture subtle differences in the color of a subject and features that are invisible to human eyes, and thus are expected to be applied to measurement, inspection, analysis, evaluation, and the like of objects in various fields. Patent literature 1 (Japanese Patent Application Laid-Open No. 2018-009988) discloses an example in which a multi-spectral image is used for quantifying particle characteristics of a coated surface.

SUMMARY

However, multi-spectral images have the following demerits.

Because the data size of a multi-spectral image is much larger than the data size of a RGB image, a high-capacity memory or a high-capacity storage device is required for storage of image data, and a long time is required for data handling (reading/writing, editing, duplication, data transmission, and the like).

The multi-spectral image cannot be directly displayed on a common RGB monitor. In addition, because software created for RGB images cannot process the multi-spectral images, past software assets cannot be utilized.

The amount of information (for example, channel number, wavelength region) of a multi-spectral image is larger than the amount of information of a RGB image, so that a long time is required for processing (measurement, inspection, analysis, evaluation, and the like) using the multi-spectral image. In addition, it is difficult to set parameters used for these processing (for example, in the case of the RGB image, the color can be specified with 3 numerical values, whereas in the case of a 16-channel multi-spectral image, 16 numerical values must be specified).

Embodiments of the present invention have been made in view of the above circumstances, and according to an aspect of the present invention, there is provided a technique for enabling convenient use of a multi-spectral image.

A first aspect of the present invention provides an image processing device including an image input part for inputting a multi-spectral image which includes N (N is an integer of 4 or more) of channels corresponding to N bands; a reference vector setting part for causing a user to set, as three reference vectors, three types of N-dimensional vectors having sensitivities of the respective N bands as elements; and a conversion part for converting the multi-spectral image into a 3-channel image including three channels by decomposing a spectral distribution of each pixel of the multi-spectral image on the basis of the three reference vectors.

According to this configuration, the multi-spectral image is converted into a 3-channel image according to the three reference vectors set (intended) by the user. Therefore, a 3-channel image can be obtained in which information of the wavelength region of interest to the user is extracted or emphasized. Moreover, the user may set the three reference vectors according to the purpose of the 3-channel image or the content of processing applied to the 3-channel image.

In addition, the merits of using the 3-channel image instead of the multi-spectral image are as follows. First, the data size of the 3-channel image is smaller than that of the original multi-spectral image, thus facilitating storage or handling of image data. Second, if the 3-channel image is processed as a pseudo RGB image, the 3-channel image can be displayed on an RGB monitor or read by the software created for RGB images (that is, a large number of RGB image assets are available). Third, because the amount of information is reduced in comparison with the original multi-spectral image, high-speed image processing can be expected. Besides, the channel number is reduced, making it easier to set parameters used for processing.

The reference vector setting part may display the reference vectors by a sensitivity curve representing sensitivities at each wavelength in a graph representing wavelength on the horizontal axis and representing sensitivity on the vertical axis, and cause the user to input parameters that define the shape of the sensitivity curve. With such a user interface, the user can intuitively grasp and set the characteristics (sensitivities at each wavelength) of the reference vector.

The reference vector setting part may display the sensitivity curve as a symmetrical distribution curve, and the parameters that define the shape of the sensitivity curve may include a mean of distribution, a height of distribution, and spread of distribution. By modeling the reference vectors with a symmetrical distribution curve (for example, Gaussian distribution), the user can set the reference vector of a desired shape with a small number of parameters, and usability can thus be improved. Moreover, the spread of distribution may be specified by variance, standard deviation, width, half width, or the like.

The reference vector setting part may superimpose and display the shapes of the three reference vectors on a screen that displays spectral distribution of a first pixel and spectral distribution of a second pixel in a comparative manner. Such a user interface is useful for confirming whether the setting of the reference vector is good or bad.

The reference vector setting part may extract three wavelengths having a large difference between the spectral distribution of the first pixel and the spectral distribution of the second pixel, create three reference vector candidates according to the extracted three wavelengths, and recommend the candidates to the user. Accordingly, when a multi-spectral image is converted into a 3-channel image, a reference vector candidate that emphasizes the difference between the first pixel and the second pixel is automatically calculated and recommended to the user. Thus, a valid reference vector can be easily set, and usability can be improved.

The reference vector setting part may create three reference vector candidates so that the difference between a value of the converted pixel obtained by decomposing the spectral distribution of the first pixel on the basis of the three reference vectors and a value of the converted pixel obtained by decomposing the spectral distribution of the second pixel on the basis of the three reference vectors is maximized, and recommend the candidates to the user. Accordingly, when a multi-spectral image is converted into a 3-channel image, a reference vector candidate that emphasizes the difference between the first pixel and the second pixel is automatically calculated and recommended. Thus, a valid reference vector can be easily set, and usability can be improved.

The reference vector setting part may automatically change, in accordance with change of the shape of any of the three reference vectors by the user, the reference vectors other than the changed reference vector so that the three reference vectors satisfy a predetermined constraint. Accordingly, a valid reference vector can be easily set, and usability can be improved.

The predetermined constraint may be a constraint that the three reference vectors are orthogonal to each other. The reason is that it can be expected that a valid conversion result (3-channel image) is obtained by setting the three reference vectors orthogonal to each other.

A second aspect of the present invention provides an image processing device including an image input part for inputting a multi-spectral image which includes N (N is an integer of 4 or more) channels corresponding to N bands; a reference vector setting part for setting, as three reference vectors, three types of N-dimensional vectors having sensitivities of the respective N bands as elements; and a conversion part for converting the multi-spectral image into a 3-channel image including three channels by decomposing a spectral distribution of each pixel of the multi-spectral image on the basis of the three reference vectors. The reference vector setting part extracts a plurality of sample pixels from one or more multi-spectral images, and obtains the three reference vectors by statistical processing based on the distribution of the plurality of sample pixels in an N-dimensional space.

According to this configuration, a multi-spectral image is converted into a 3-channel image according to the three reference vectors automatically determined from the plurality of sample pixels. This method allows automatic setting of a reference vector suitable for extracting or emphasizing the characteristic image information included in the multi-spectral image given in the sample. Moreover, a plurality of sets of reference vectors having different characteristics may also be set by appropriately changing the image or the pixel given as a sample. Besides, the reference vector used for conversion may be changed according to the purpose of the 3-channel image or the content of the processing applied to the 3-channel image.

In addition, the merits of using the 3-channel image instead of the multi-spectral image are as follows. First, since the data size of the 3-channel image is smaller than that of the original multi-spectral image, the image data can be easily saved or handled. Second, if the 3-channel image is processed as a pseudo RGB image, the 3-channel image can be displayed on an RGB monitor or read by the software created for RGB images (that is, a large number of RGB image assets are available). Third, because the amount of information is reduced in comparison with the original multi-spectral image, high-speed image processing can be expected. Besides, the channel number is reduced, making it easier to set parameters used for processing.

The reference vector setting part may obtain, based on the distribution of the plurality of sample pixels in the N-dimensional space, a first principal component, a second principal component, and a third principal component by principal component analysis, and set the first to third principal components as the three reference vectors. Accordingly, a reference vector suitable for expressing the distribution of the plurality of sample pixels is set, and therefore it can be expected that a valid conversion result (3-channel image) is obtained.

When the plurality of sample pixels are pixel groups to be classified into two categories, the reference vector setting part may obtain a discrimination boundary of the two categories by discriminant analysis based on the distribution of the plurality of sample pixels in the N-dimensional space, determine one reference vector so as to make it orthogonal to the discrimination boundary, and determine the other two reference vectors so as to make them orthogonal to the one reference vector. By converting the multi-spectral image using the reference vectors determined in this way, a 3-channel image can be obtained in which the difference between the image features of the two categories is emphasized.

When the plurality of sample pixels are pixel groups to be classified into three categories, the reference vector setting part may obtain a discrimination boundary of a first category and a second category, a discrimination boundary of the second category and a third category, and a discrimination boundary of the third category and the first category respectively by discriminant analysis, based on the distribution of the plurality of sample pixels in the N-dimensional space, and determine the three reference vectors so as to make them orthogonal to the three discrimination boundaries respectively. By converting the multi-spectral image using the reference vectors determined in this way, a 3-channel image can be obtained in which the difference in the image features of the three categories is emphasized.

The image processing device may include an output part for outputting the 3-channel image converted by the conversion part as data in the form of an RGB image. This allows the converted 3-channel image to be processed by various software created for RGB images.

Among three channels of the 3-channel image, the output part may allocate the channel corresponding to the longest wavelength to an R channel, the channel corresponding to the second longest wavelength to a G channel, and the channel corresponding to the shortest wavelength to a B channel, respectively. Accordingly, when the converted 3-channel image is displayed on the RGB monitor or the like, the 3-channel image can be displayed in a color tone with a relatively small sense of discomfort.

The conversion part may obtain the value of each pixel of the 3-channel image by calculating the inner product of the spectral distribution of each pixel of the multi-spectral image and each reference vector. Accordingly, the calculation of the 3-channel image becomes simple.

A third aspect of the present invention provides an image sensor including a multispectral camera capable of outputting a multi-spectral image which includes N (N is an integer of 4 or more) channels corresponding to N bands, and the image processing device that converts a multi-spectral image output from the multispectral camera into a 3-channel image.

According to embodiments of the present invention, the multi-spectral image can be used easily.

Figure 7:
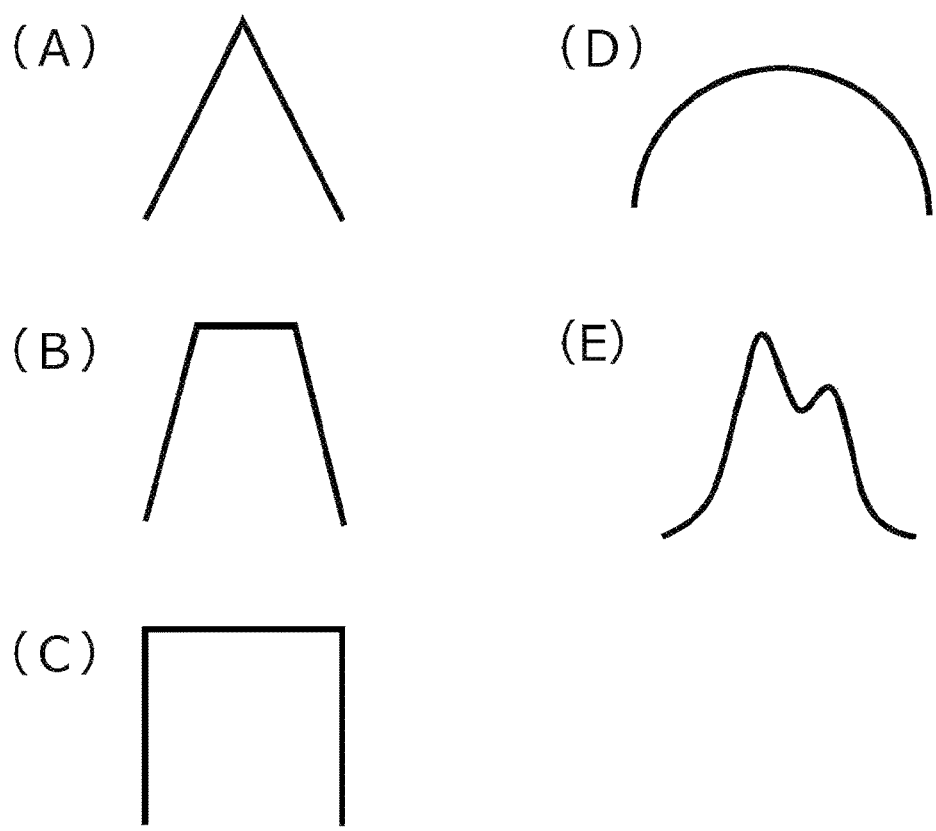

(A)~(E) of FIG. 7 are diagrams showing examples of the shapes of the reference vectors.

Figure 8:
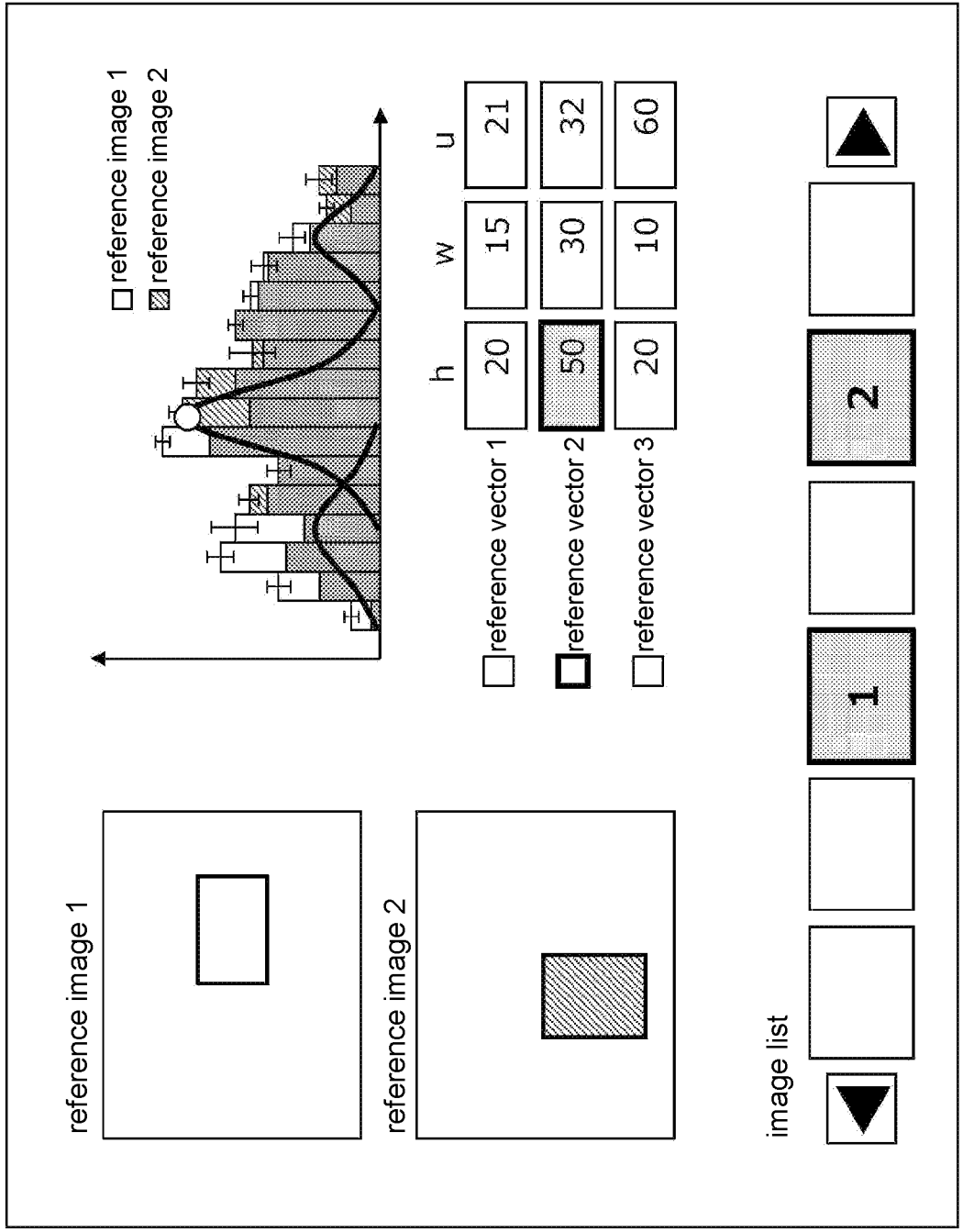

FIG. 8 is a diagram showing an example of a setting screen of the reference vectors.

Figure 9:
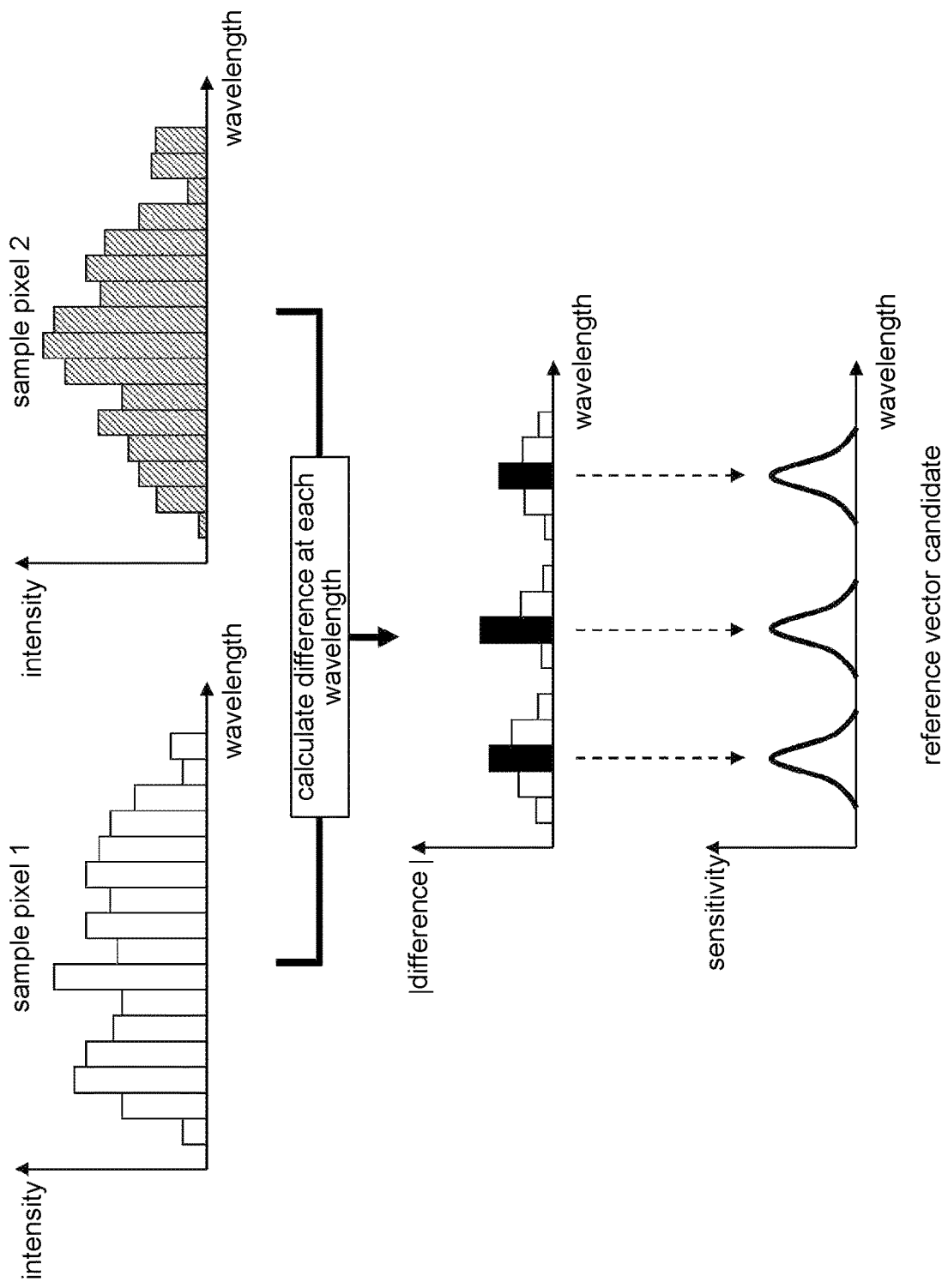

FIG. 9 is a diagram schematically showing an example of generating reference vector candidates.

Figure 10:
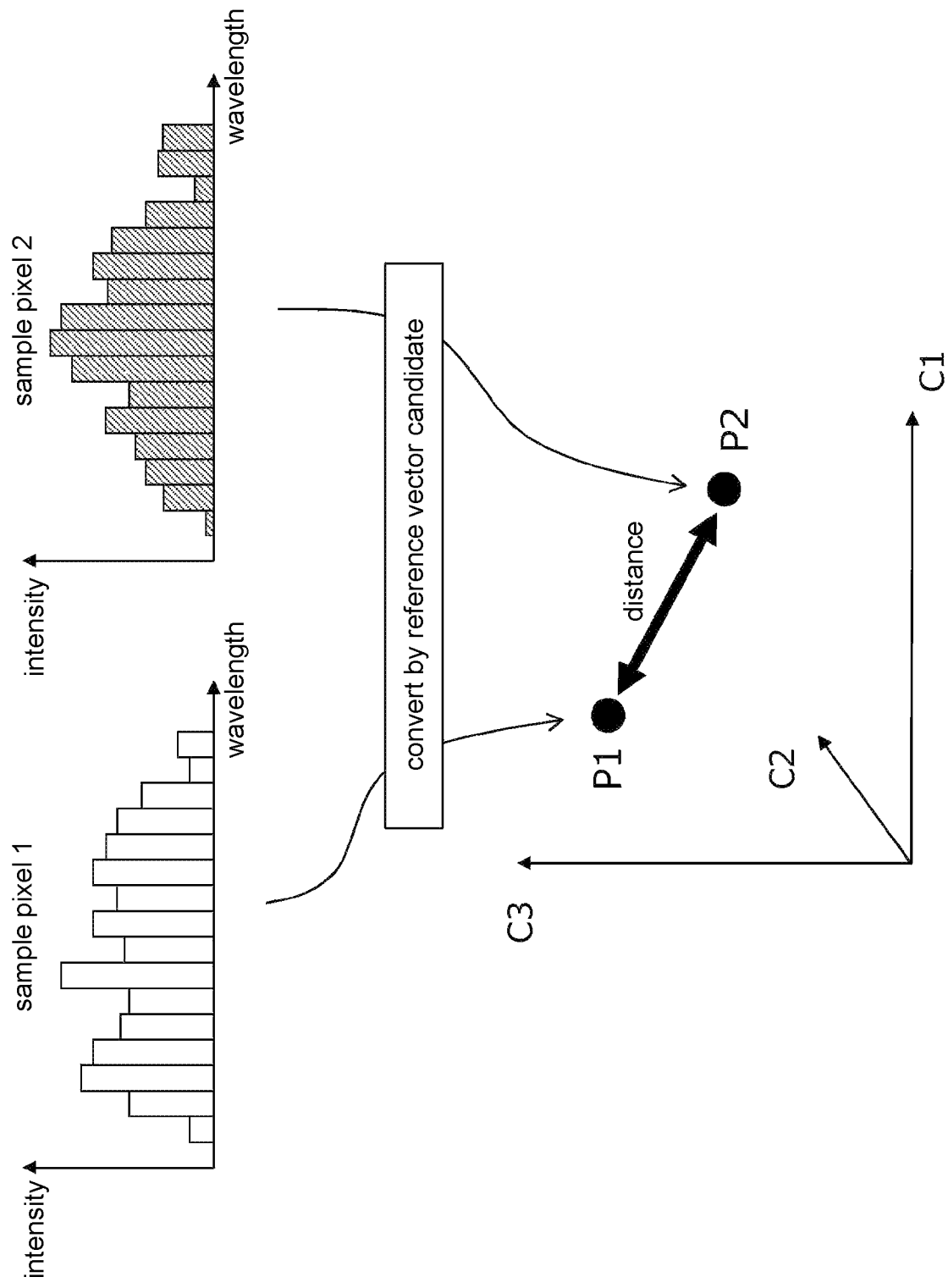

FIG. 10 is a diagram schematically showing another example of generating reference vector candidates.

Figure 11:
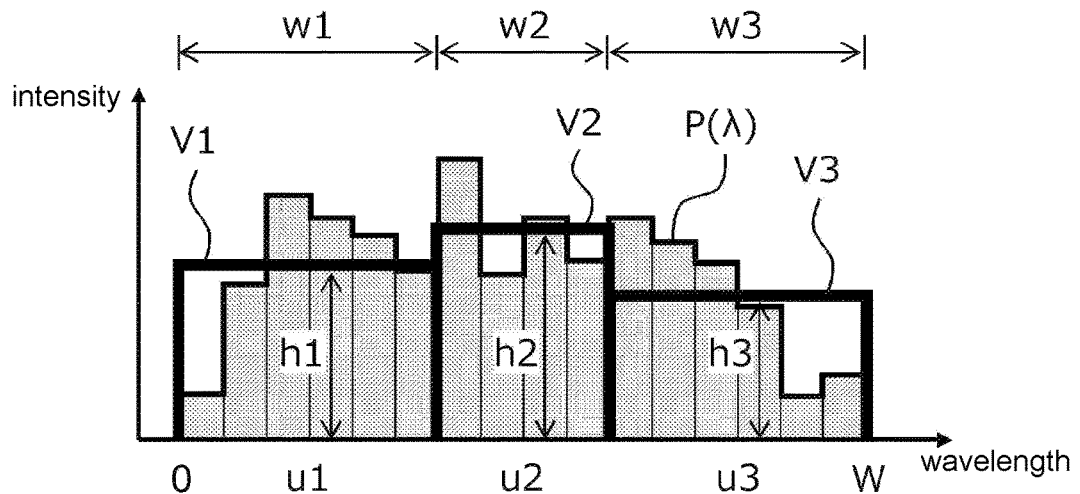

FIG. 11 is a diagram for explaining linkage of the reference vectors.

Figure 12:
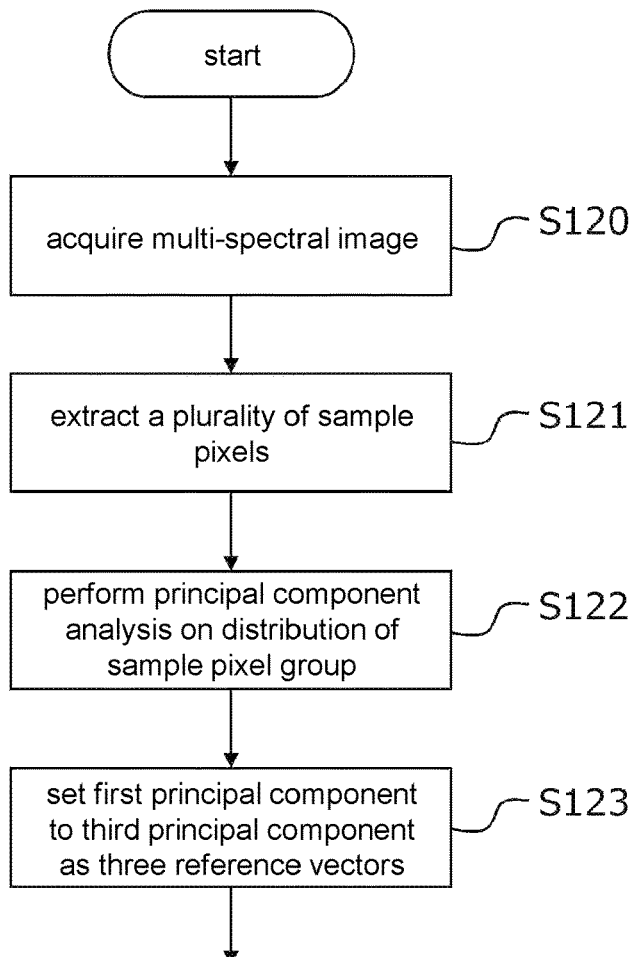

FIG. 12 is a flowchart showing an example of an automatic setting method of the reference vectors by statistical processing.

Figure 13:
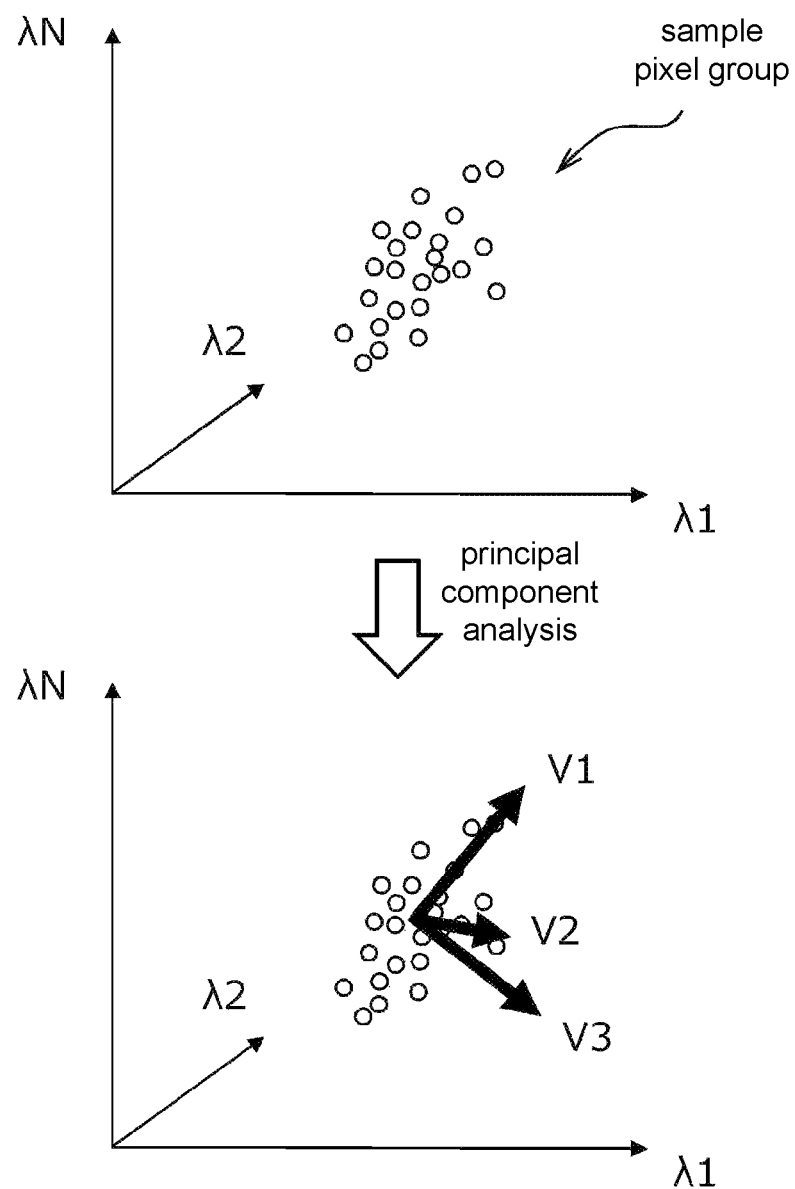

FIG. 13 is a diagram schematically showing an example of a sample pixel group and reference vectors.

Figure 14:
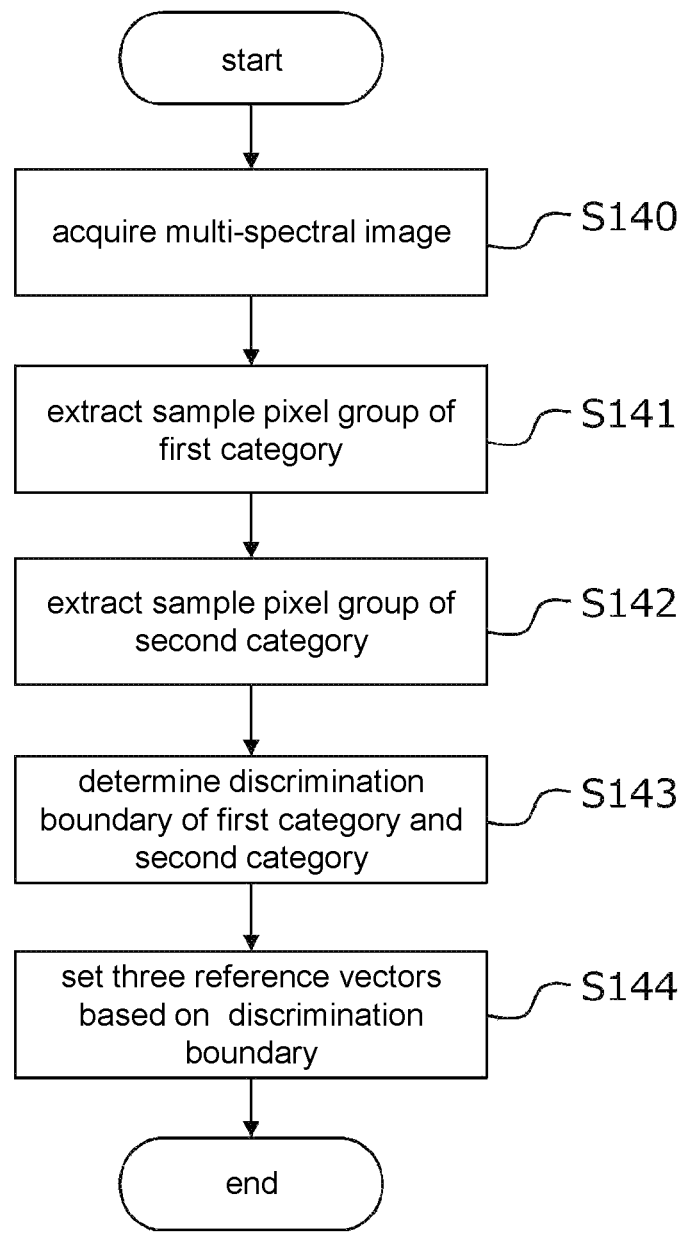

FIG. 14 is a flowchart showing another example of an automatic setting method of reference vectors by statistical processing.

Figure 15:
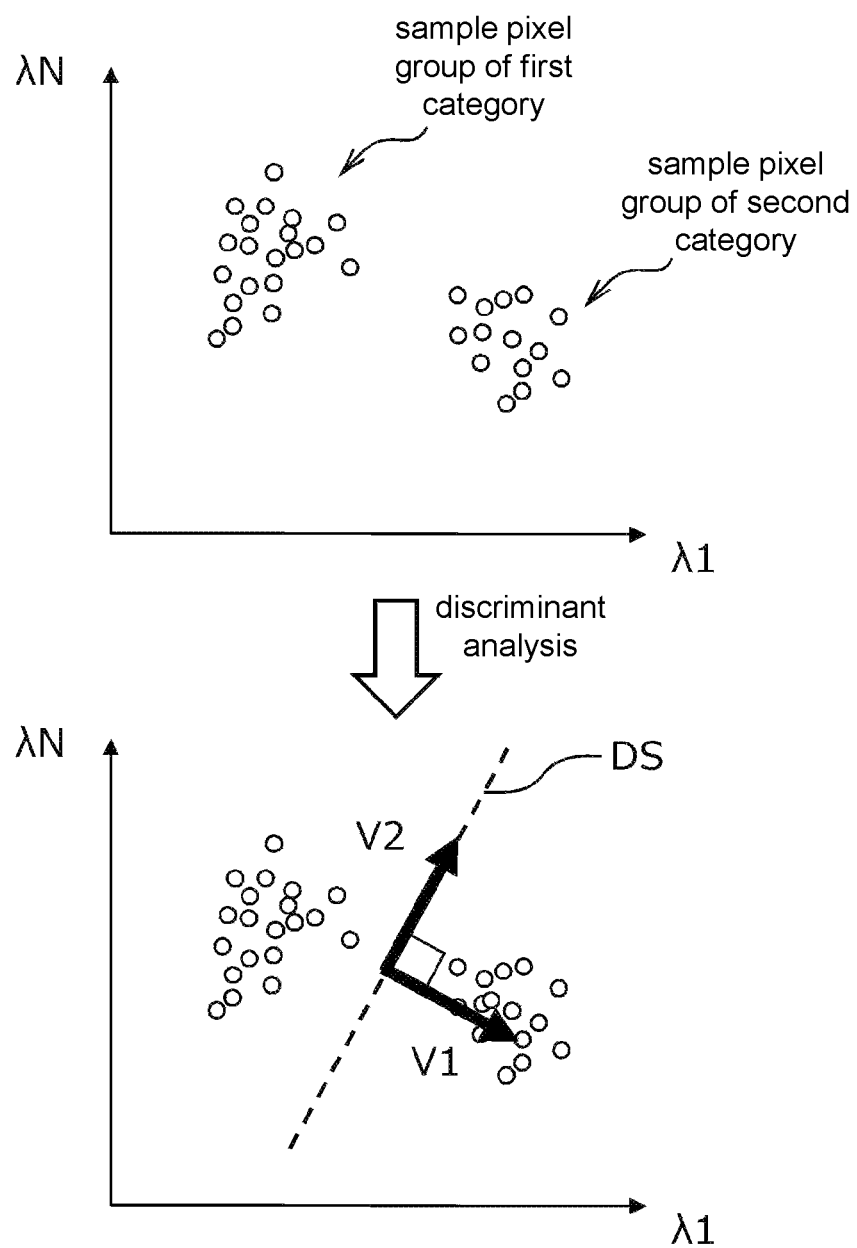

FIG. 15 is a diagram schematically showing an example of a discrimination boundary of two categories and an example of reference vectors.

Figure 16:
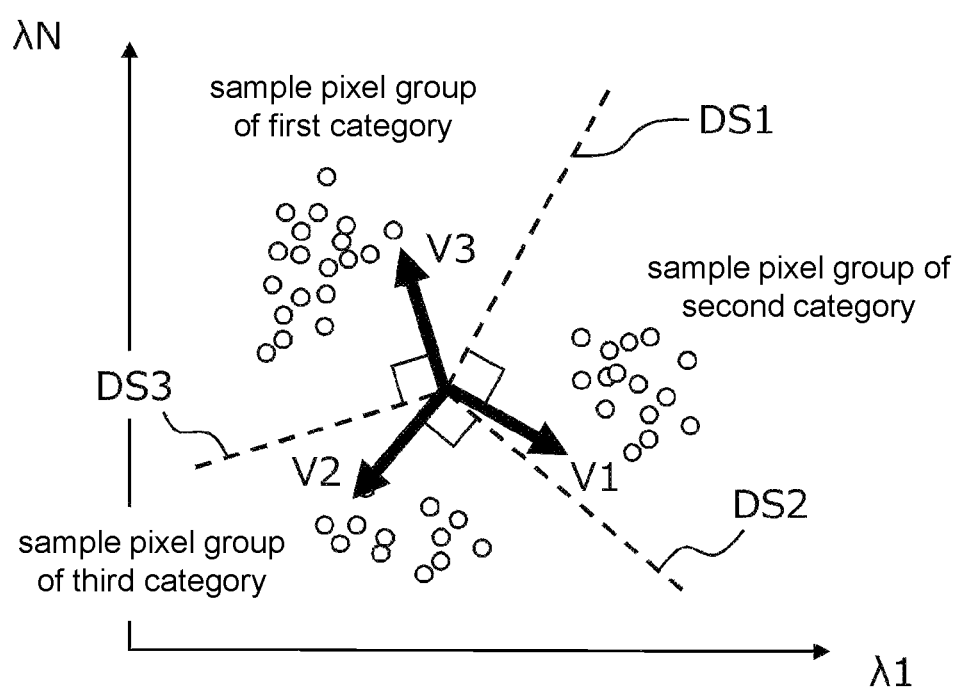

FIG. 16 is a diagram schematically showing an example of discrimination boundaries of three categories and an example of reference vectors.

DESCRIPTION OF THE EMBODIMENTS

Application Example

Figure 1:
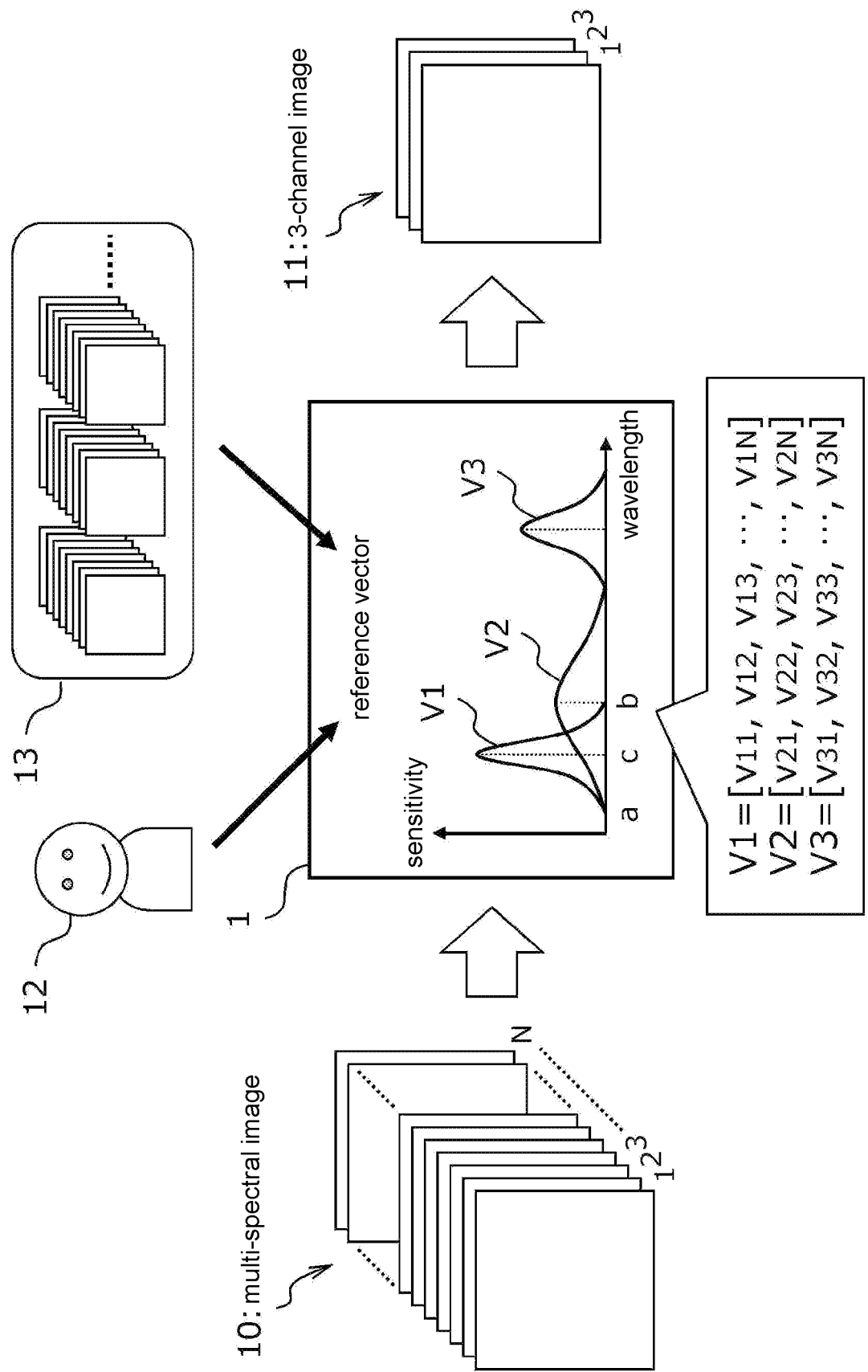
FIG. 1 is a diagram showing an application example of the present invention.

FIG. 1 schematically shows one of application examples of the present invention. An image processing device 1 shown in FIG. 1 is capable of converting a multi-spectral image 10 which includes N (N is an integer of 4 or more) channels corresponding to N bands into a 3-channel image 11 including three channels and outputting the 3-channel image 11. The 3-channel image 11 is easier to use than the original multi-spectral image 10. The reason is that the 3-channel image 11 has a smaller data size than the multi-spectral image 10, and the image data can thus be easily saved and handled, and if the 3-channel image 11 is processed as a pseudo RGB image, it can be displayed on a RGB monitor and read by software created for RGB images. In addition, because the amount of information is reduced as compared with the multi-spectral image 10, various processing (for example, measurement, inspection, analysis, evaluation, and the like) using the image can be performed at a high speed. Besides, the 3-channel image 11 also has an advantage of simplification in setting of parameters used for processing due to a reduction in channel numbers (for example, if it is necessary to set parameters for each channel, the number of parameters is 3/N, so the setting time is also 3/N by simple calculation).

Meanwhile, even in the conventional system, a system having a function of converting a multi-spectral image into an RGB image is known. However, with simple RGB conversion, image features required for the various processing (measurement, inspection, analysis, evaluation, and the like) described above may be lost, which may cause a reduction in processing precision (that is, the advantages of multi-spectral images cannot be utilized). For example, it is assumed that when an abnormality occurs in an inspection object, the intensity of a near-infrared wavelength and a yellow wavelength of the reflection spectrum of the inspection object is varied. Such anomalies can be easily detected by monitoring the near-infrared bands or the yellow bands using the multi-spectral image. However, in the image after RGB conversion, the information of the near infrared bands or the yellow bands is lost (or buried in the characteristics of other bands), making it difficult to detect abnormality.

On the other hand, the image processing device 1 in this application example uses three reference vectors V1, V2, and V3 set by a user 12 or automatically set by statistical processing using a large number of samples 13 to convert (dimensionally compress) the multi-spectral image 10 into the 3-channel image 11.

The "reference vector" defines the wavelength characteristics (sensitivities at each wavelength) of each channel of the 3-channel image 11. Specifically, the reference vector is represented by an N-dimensional vector having, as an element, the sensitivity of the respective N bands of the multi-spectral image 10. Here, the "sensitivity for a wavelength or a band" can also be referred to as "intensity of influence of light intensity in the wavelength or the wavelength region on the pixel values in the channels of the 3-channel image 11". Conceptually, as shown in FIG. 1, the reference vector can be represented by a curve in a graph representing wavelength on the horizontal axis and sensitivity on the vertical axis (this curve is called a "sensitivity curve"). In this example, it can be seen that a reference vector V1 has a characteristic that it has a sensitivity in a wavelength region of wavelength a to wavelength b and has a highest sensitivity at wavelength c.

According to this configuration, for example, the three reference vectors V1, V2, and V3 are designed so as to emphasize the image features used in the subsequent-stage processing (measurement, inspection, analysis, evaluation, and the like) using the 3-channel image 11. Accordingly, the precision of the subsequent-stage processing can be maintained or enhanced and the data size and the information amount of the image can be reduced. For example, in the above case, it is preferable to use a reference vector having a high sensitivity at the near infrared and a reference vector having a high sensitivity at the yellow wavelength. The reason is that it is possible to generate the 3-channel image 11 in which an intensity change in the near-infrared or the yellow wavelength is apt to appear as image features.

Moreover, in the present specification, the term "channel" is used to mean a color channel representing color information, and does not include a so-called mask channel such as an α channel. Therefore, an image composed of a total of four channels, that is, three color channels and one mask channel, is also referred to as a 3-channel image in the present specification.

First Embodiment (Device Configuration)

Figure 2:
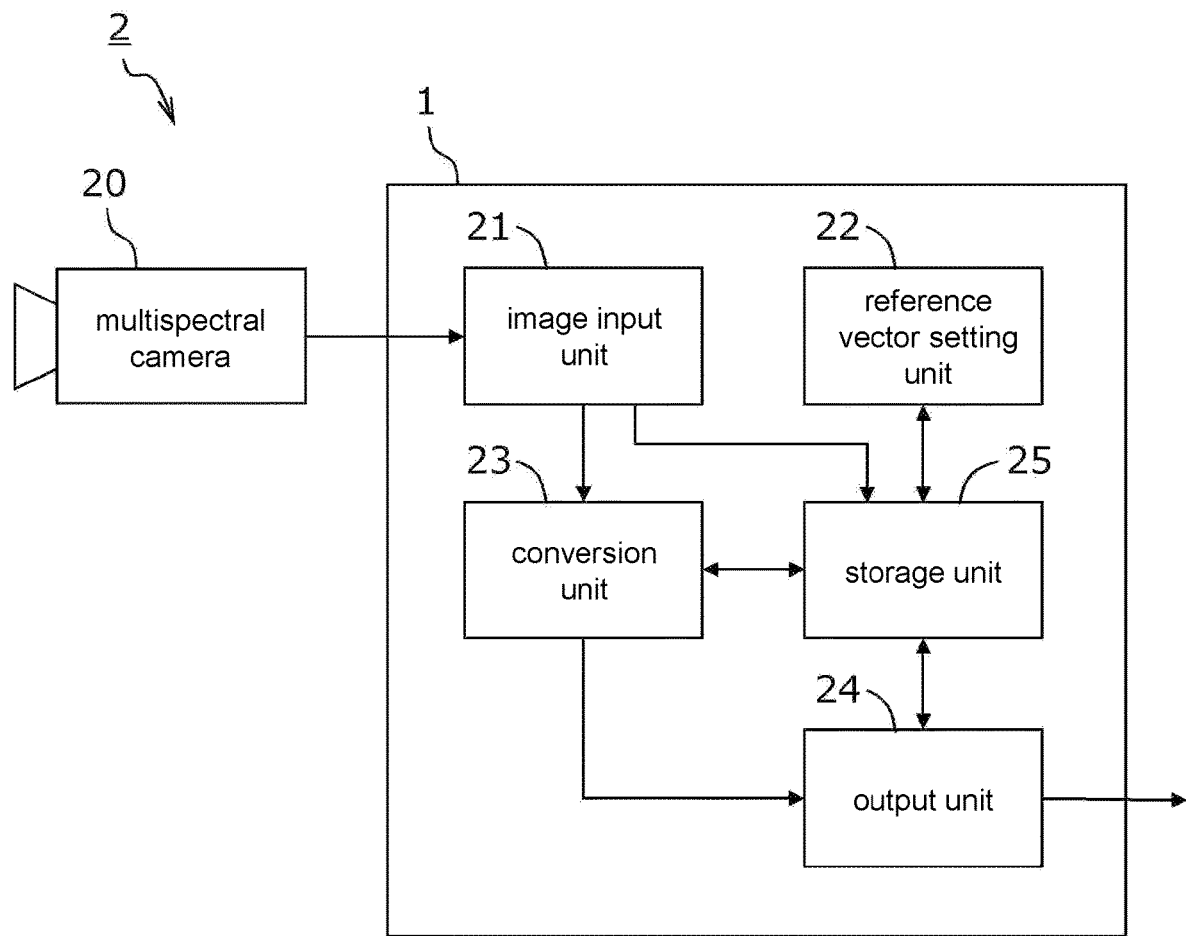
FIG. 2 is a diagram showing a configuration example of an image sensor in which the present invention is applied.

FIG. 2 shows a configuration example of an image sensor 2 in which the present invention is applied.

The image sensor 2 includes a multispectral camera 20 and the image processing device 1. The image sensor 2 is a device installed in, for example, a manufacturing line in a factory and used for various processing using images. The image sensor 2 is also called a vision sensor or a vision system. In the image sensor 2 of the present embodiment, the imaging system (the multispectral camera 20) and the processing system (the image processing device 1) are separately configured. However, the imaging system may also be configured integrally with the processing system.

The multispectral camera 20 is an imaging device capable of generating and outputting a multi-spectral image of a subject by multispectral imaging. In the present embodiment, a 16-band multispectral camera 20 is used to obtain a 16-channel multi-spectral image. Various methods have been proposed for multispectral imaging, such as a method of using a plurality of color filters, a method of switching illumination colors, a method of dispersing with an optical element such as a diffraction grating, and the like. Any of the above methods can be used.

The image processing device 1 is a device for converting a multi-spectral image captured from the multispectral camera 20 into a 3-channel image, performing various processing using the multi-spectral image and the 3-channel image (feature extraction, measurement, inspection, analysis, evaluation, and the like), performing data communication with external devices such as a programmable logic controller (PLC), controlling the multispectral camera 20, and the like. The image processing device 1 has, for example, a computer having a processor (CPU), a memory, a storage device, a communication module, and I/O, a display device such as a liquid crystal display, and an input device such as a mouse and a touch panel. Various programs are stored in the storage device, and when the image sensor 2 is in operation, necessary programs are loaded into the memory and executed by the processor to provide the processing and functions of the image processing device 1. Moreover, at least a part of the processing and functions of the image processing device 1 may be configured by a circuit such as an ASIC, FPGA or the like, or may be configured by distributed computing or cloud computing.

As shown in FIG. 2, the image processing device 1 has an image input unit 21, a reference vector setting unit 22, a conversion unit 23, an output unit 24, and a storage unit 25. The image input unit 21, the reference vector setting unit 22, the conversion unit 23, and the output unit 24 are functions provided by the processor executing a program, and the storage unit 25 is provided by a non-volatile memory or storage device.

(Conversion Processing)

Figure 3:
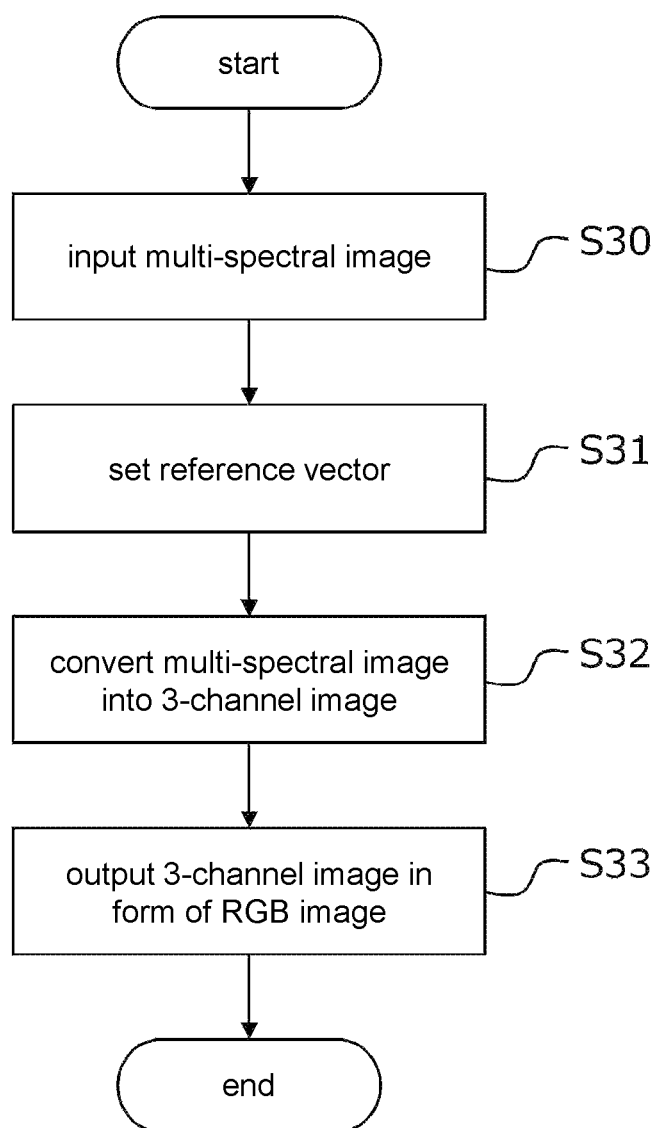
FIG. 3 is a flowchart showing a flow of conversion processing performed by an image processing device.

FIG. 3 shows a flow of conversion processing performed by the image processing device 1.

In step S30, the image input unit 21 inputs a multi-spectral image from the multispectral camera 20. The input image data is passed to the conversion unit 23 or stored in the storage unit 25. Moreover, the input source of the image is not limited to the multispectral camera 20, and the image may be read from an internal or external storage device, or may be taken from an external computer via a network.

In step S31, the reference vector setting unit 22 sets three reference vectors. The information of the set reference vectors is stored in the storage unit 25. The method for setting reference vector is largely divided into a method of manually setting by a user and a method of automatically setting by a machine (the reference vector setting unit 22). The details of the setting method are described later.

Figure 4:
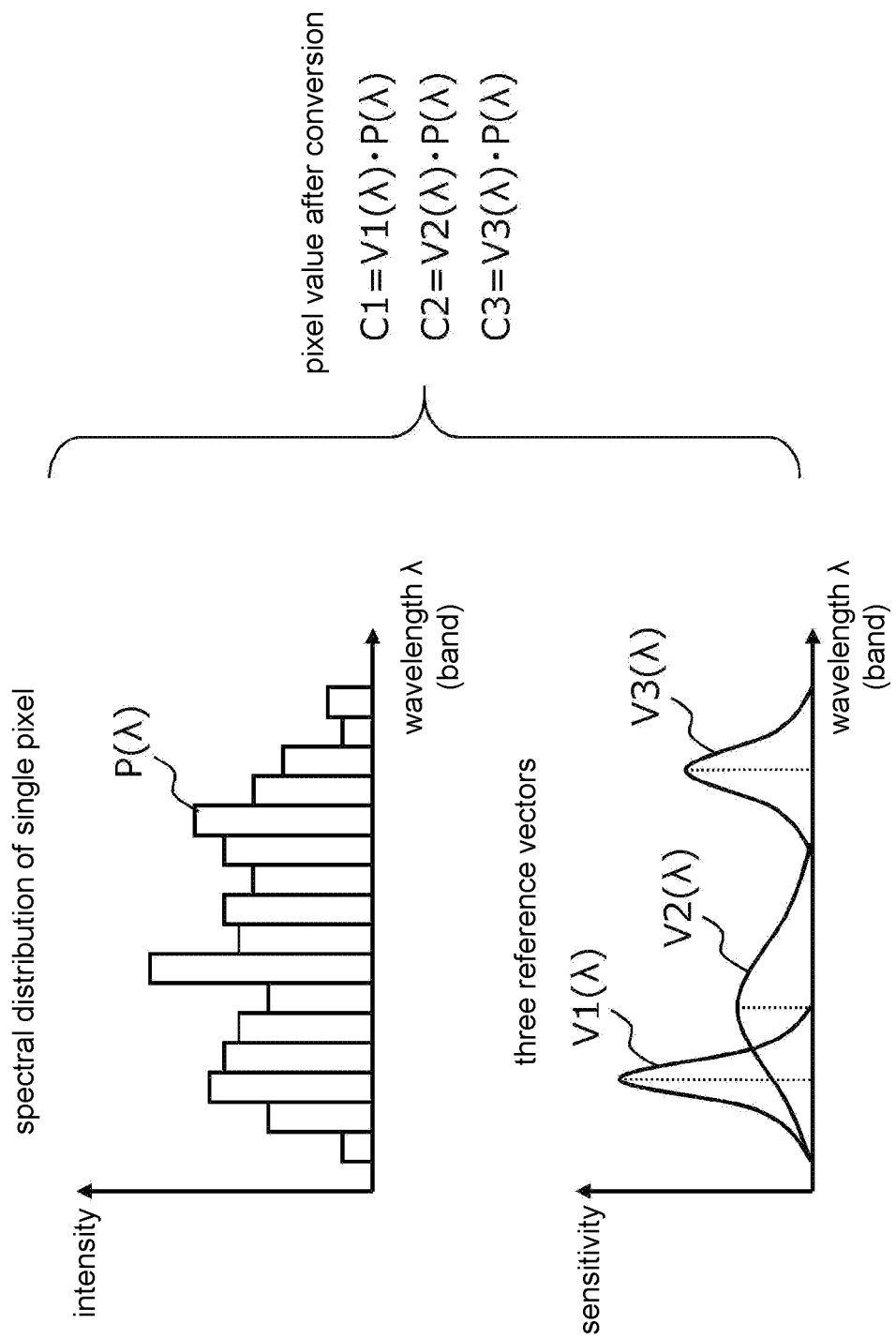
FIG. 4 is a diagram schematically showing a specific example of conversion processing using reference vectors.

In step S32, the conversion unit 23 converts the multi-spectral image into a 3-channel image using the three reference vectors. A specific example of the processing in step S32 is shown in FIG. 4. As shown in FIG. 4, one pixel of the multi-spectral image is represented by a 16-band spectral distribution $P(\lambda)$. The horizontal axis represents wavelength (band) $\lambda$, and the vertical axis represents light intensity. Here, the spectral distribution $P(\lambda)$ can be treated as a 16-dimensional vector having light intensities at each band as an element. On the other hand, the reference vectors $V1(\lambda)$, $V2(\lambda)$, and $V3(\lambda)$ are 16-dimensional vectors having sensitivities of each band (specifically, a coefficient having a range of 0.0 to 1.0) as elements. The conversion unit 23 obtains a value $C=(C1, C2, C3)$ of each pixel of the 3-channel image by calculating the inner product of the spectral distribution $P(\lambda)$ of each pixel and the respective reference vectors $V1(\lambda)$, $V2(\lambda)$, and $V3(\lambda)$. In the present specification, the operation of converting the spectral distribution into three values by using three reference vectors is referred to as separation by reference vector or color separation. The converted 3-channel image data is passed to the output unit 24 or stored in the storage unit 25.

In step S33, the output unit 24 converts the 3-channel image obtained in step S32 into data in the form of an RGB image and outputs it to an external device or an RGB monitor. Any specific image format can be used, and examples thereof include TIFF, JPEG (JFIF), BMP, PNG, GIF, and the like.

At this time, among the three channels of the 3-channel image, the output unit 24 may allocate the channel corresponding to the longest wavelength to an R channel, the channel corresponding to the second longest wavelength to a G channel, and the channel corresponding to the shortest wavelength to a B channel, respectively. The wavelength corresponding to the channel may be defined as, for example, the center wavelength or the average wavelength of the reference vector used for calculating the value of the channel. In the example of FIG. 4, the channel calculated by the reference vector $V3(\lambda)$ is the R channel, the channel calculated by the reference vector $V2(\lambda)$ is the G channel, and the channel calculated by the reference vector $V1(\lambda)$ is the B channel. Because each of the reference vectors $V1(\lambda)$ to $V3(\lambda)$ can be set regardless of the RGB wavelength, the converted 3-channel image does not reproduce the actual color of the subject. However, when the 3-channel image is displayed on the RGB monitor or displayed on image processing software created for RGB images, and an image that is significantly different from the actual subject in hue or color tone appears, the user may feel a sense of discomfort or misidentify the image. Thus, the output unit 24 allocates RGB to each channel of the 3-channel image according to the above rule. Accordingly, when the 3-channel image is displayed on the RGB monitor or the like, a display image having a hue or color with a relatively small sense of discomfort can be obtained.

(Setting Method of Reference Vectors)

Next, a specific example of setting method of the reference vectors by the reference vector setting unit 22 is described.

(1) User Setting

Figure 5:
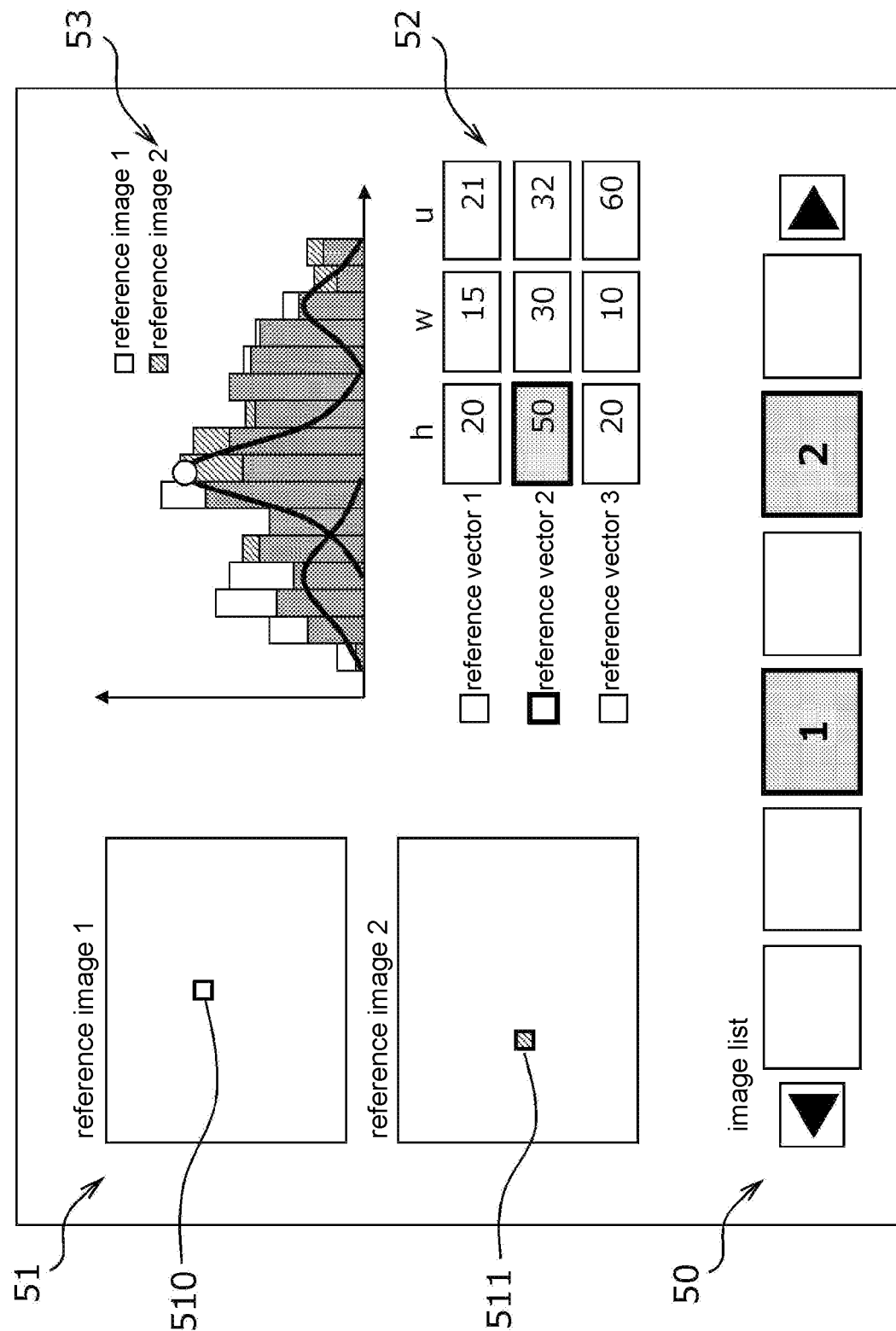
FIG. 5 is a diagram showing an example of a setting screen of the reference vectors.

FIG. 5 shows an example of a setting screen of the reference vectors. This setting screen includes an image list field 50, a reference image display field 51, a reference vector parameter input field 52, and a reference vector confirmation field 53.

A list of multi-spectral images stored in the storage unit 25 is displayed as thumbnails in the image list field 50. If all the images cannot be displayed at once, the thumbnails to be displayed can be changed in order by pressing scroll buttons on the left and right of the list. The user can select, from the image list field 50, one or two images (referred to as "reference images") to be referred to when setting the reference vectors. The example of FIG. 5 shows a state in which two images highlighted in a thick frame are selected as reference images.

The reference image display field 51 is an area for displaying the reference images selected by the user. The user can select a sample pixel by designating an arbitrary point in the reference image using a pointing device or the like. In FIG. 5, cursors 510 and 511 in the reference image display field 51 indicate sample pixels selected from each reference image.

When the sample pixel is selected by the user, the spectral distribution of the sample pixel is displayed in the reference vector confirmation field 53. In the reference vector confirmation field 53, the spectral distribution of the sample pixels of Reference image 1 (white bar graph) and the spectral distribution of the sample pixels of Reference image 2 (hatched bar graph) are transparently superimposed and drawn. By observing this graph, the user can compare the spectral distributions of the two sample pixels and easily grasp the common features and differences.

In addition, in the reference vector confirmation field 53, the sensitivity curves of the three reference vectors V1 to V3 are superimposed and displayed on the spectral distribution of the sample pixels. The user can deform the shape of the sensitivity curve in the reference vector confirmation field 53 by a drag operation using a pointing device or the like, or freely design the characteristics of each of the vectors V1 to V3 by inputting parameters in the reference vector parameter input field 52 using a keyboard or the like.

Figure 6:
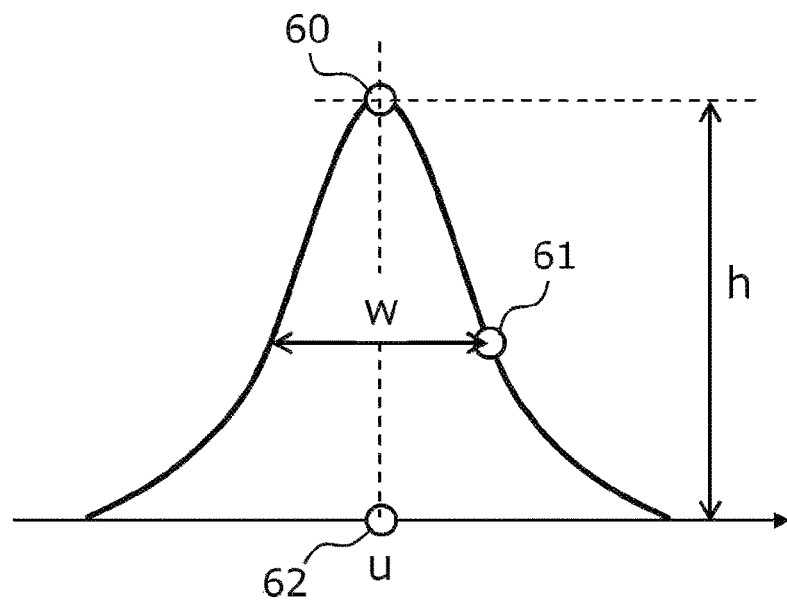
FIG. 6 is a diagram showing an example of parameters that define the shape of a sensitivity curve of the reference vector.

FIG. 6 shows an example of parameters that define the shape of the sensitivity curve of the reference vector. In the present embodiment, the sensitivity curve is represented by a Gaussian distribution, and the shape of the sensitivity curve can be specified by three parameters: a mean u of distribution, a height h of distribution, and spread w of distribution. In the case of drag operation, by selecting any one of the three cursors 60, 61 and 62 and moving it horizontally or vertically, the horizontal movement of the entire sensitivity curve, the vertical movement of the vertex of the sensitivity curve and the spread of distribution (standard deviation) can be adjusted. In the case of parameter input, the shape of the sensitivity curve can be changed by inputting the values of u, h, and w in the text box. Moreover, because the reference vector confirmation field 53 is linked with the reference vector parameter input field 52, the contents input in one field are also reflected in the other field.

Although the sensitivity curve is represented by the Gaussian distribution in the present embodiment, the shape of the sensitivity curve is not limited thereto. A triangular sensitivity curve as shown in (A) of FIG. 7, a trapezoidal sensitivity curve as shown in (B) of FIG. 7, a rectangular sensitivity curve as shown in (C) of FIG. 7, or a semicircular sensitivity curve as shown in (D) of FIG. 7 may be used. By using the Gaussian distribution and symmetrical distribution curves as shown in (A)~(D) of FIG. 7, the user can set the reference vector of a desired shape with a small number of parameters (for example, three parameters: mean u, height h, and spread w), thus improving usability. However, the reference vector may also be set by a sensitivity curve that is not symmetrical. For example, a bimodal curve may be used as shown in (E) of FIG. 7, or a free curve may be used.

According to the user interface as described above, the user can easily set three reference vectors having a desired shape. In addition, the reference vector can be set while referring to the spectral distribution of the sample pixels of the reference image, and therefore setting of reference vectors suitable for decomposing the reference image or similar images becomes simple.

For example, if the reference vector is set so as to include wavelengths that are greatly different between the two spectral distributions while observing the reference vector confirmation field 53, conversion into a 3-channel image which is suitable for discrimination between Reference image 1 and Reference image 2 can be achieved. As a specific example, if the sample pixels are picked up from each of the reference images of a non-defective product and the reference images of a defective product, a 3-channel image suitable for determining the quality of the product can be obtained. In addition, by picking up sample pixels from each of the reference images of A-rank product and the reference images of B-rank product, a 3-channel image suitable for grading products can be obtained.

Moreover, although FIG. 5 shows an example of picking up sample pixels from two different reference images, the present invention is not limited thereto. A plurality of sample pixels may be picked up from one reference image. For example, by picking up sample pixels from each of the subject area and the background area in the image, a 3-channel image that facilitates segmentation of the subject (foreground) and the background can be obtained. In addition, three or more sample pixels can be picked up for comparison of three or more spectral distributions in the reference vector confirmation field 53.

As shown in FIG. 8, instead of a single pixel, an area (a plurality of pixels) in the reference image may also be designated as a sample pixel. In that case, the average spectral distribution obtained by averaging the spectral distributions of the plurality of pixels may be displayed in the reference vector confirmation field 53. At this time, the average spectral distribution may be displayed by a bar graph with an error bar indicating a variation in spectral intensity.

(2) Reference Vector Recommendation (Part 1)

The reference vector setting unit 22 may automatically create reference vector candidates based on the spectral distribution of the sample pixels and recommend the reference vector candidates to the user.

FIG. 9 shows one of the examples of generating the reference vector candidates. The reference vector setting unit 22 calculates a difference (absolute value) of the spectral intensity of each wavelength (band) between the spectral distribution of Sample pixel 1 obtained from Reference image 1 and the spectral distribution of Sample pixel 2 obtained from Reference image 2. Then, the reference vector setting unit 22 extracts three wavelengths having a large difference (the part shown in black in the middle of FIG. 9), and creates three reference vector candidates according to the extracted three wavelengths (lower part of FIG. 9). For example, the reference vector setting unit 22 may simply arrange the sensitivity curves of a predetermined shape (default shape) at the positions of the three extracted wavelengths, or may adjust the height or width of the sensitivity curve according to the magnitude of the difference or distribution spread of the difference shown in the middle part of FIG. 9.

According to the recommendation function, when a multi-spectral image is converted into a 3-channel image, the reference vector candidates that emphasize the difference between the two sample pixels are automatically calculated and recommended to the user. The user may directly adopt these reference vector candidates, or may set a final reference vector by fine-tuning the shape of these reference vector candidates. Thus, a valid reference vector can be easily set, and usability can be improved.

(3) Reference Vector Recommendation (Part 2)

FIG. 10 shows another example of generating the reference vector candidates. The reference vector setting unit 22 first sets an initial value of the reference vector candidate (for example, the reference vector candidate obtained by the method shown in FIG. 9 may be used as the initial value). Next, the reference vector setting unit 22 converts the spectral distribution of Sample pixel 1 and the spectral distribution of Sample pixel 2 by the reference vector candidates, respectively, and calculates the values of the pixels P1 and P2 of the 3-channel image. The pixels P1 and P2 are three-dimensional vectors having values of channels C1, C2, and C3 as elements. Next, the reference vector setting unit 22 calculates and evaluates the absolute value of the difference between the pixels P1 and P2 (that is, a distance in the three-dimensional space). Then, the reference vector setting unit 22 repeats the above processing while updating the reference vector candidates, and obtains a reference vector candidate that maximizes the distance between the pixels P1 and P2.

Moreover, a search algorithm for the reference vector candidate may be designed in any way. In addition, it is not necessary to perform strict maximization, and a reference vector candidate having the maximum distance in search for a preset number of times may be adopted, or the search processing may be stopped when a reference vector candidate satisfying a predetermined evaluation function is found. Besides, in FIG. 10, the distance between the two pixels is evaluated. However, when Sample pixels 1 and 2 are each composed of a pixel group as shown in FIG. 8, the distance between the two pixel groups may be evaluated. The distance between the pixel groups can be evaluated by, for example, Mahalanobis distance or the like.

According to the recommendation function, when a multi-spectral image is converted into a 3-channel image, the reference vector candidates that emphasize the difference between the two sample pixels are automatically calculated and recommended to the user. The user may directly adopt these reference vector candidates, or may set a final reference vector by fine-tuning the shape of these reference vector candidates. Thus, a valid reference vector can be easily set, and usability can be improved.

(4) Linkage of Reference Vectors (Part 1)

The reference vector setting unit 22 may link the shapes of the three reference vectors so that the three reference vectors satisfy a predetermined constraint. For example, under a constraint that "three reference vectors are orthogonal to each other", when the shape of any of the reference vectors is changed by the user, the reference vector setting unit 22 deforms the other two reference vectors so as to satisfy the following formula ("·" denotes inner product of vectors).

$V1 \cdot V2 = 0$ $V2 \cdot V3 = 0$ $V3 \cdot V1 = 0$

By setting the three reference vectors orthogonal to each other in this way, it can be expected that the spectral distribution can be appropriately decomposed and a valid conversion result (3-channel image) can be obtained.

(5) Linkage of Reference Vectors (Part 2)

FIG. 11 shows another example of linkage of the reference vectors. Here, the reference vectors V1 to V3 are represented by a rectangular sensitivity curve. In FIG. 11, u1, u2, and u3 denote the center wavelengths of the reference vectors V1, V2, and V3, w1, w2, and w3 denote the widths of the reference vectors V1, V2, and V3, and h1, h2, and h3 denote the heights of the reference vectors V1, V2, and V3. In addition, P(λ) is the spectral distribution of the sample pixels picked up from Reference image 1, and W is the width of the entire spectral distribution P(λ).

Here, when the shape of any one of the reference vectors is changed by the user, the reference vector setting unit 22 deforms the other two reference vectors so as to satisfy the constraint represented by the following formula.

$$w1 + w2 + w3 = W \qquad \text{[Formula 1]}$$

$$u1 = \frac{w1}{2}$$

$$u2 = w1 + \frac{w2}{2}$$

$$u3 = w1 + w2 + \frac{w3}{2}$$

$$w1 \times h1 = \frac{1}{\alpha} \times \int_0^{w1} P(\lambda)d\lambda$$

$$w2 \times h2 = \frac{1}{\alpha} \times \int_{w1}^{w1+w2} P(\lambda)d\lambda$$

$$w3 \times h3 = \frac{1}{\alpha} \times \int_{w1+w2}^{W} P(\lambda)d\lambda$$

$$\alpha = \max_\lambda P(\lambda)$$

By providing such a constraint, the three reference vectors V1, V2, and V3 can be set so as to approximate the waveform characteristics of the entire spectral distribution P(λ) of the sample pixel. Therefore, it can be expected that the spectral distribution is appropriately decomposed and a valid conversion result (3-channel image) is obtained.

(6) Automatic Setting of Reference Vector by Statistical Processing (Principal Component Analysis)

FIG. 12 is a flowchart showing an example of an automatic setting method of reference vectors by statistical processing. In this example, principal component analysis is used as statistical processing.

In step S120, the reference vector setting unit 22 acquires a multi-spectral image used for the statistical processing. In this example, the multi-spectral image to be converted (the image input in step S30 in FIG. 3) is directly used for the statistical processing. The reason is that it can be expected that a reference vector suitable for extracting the features of the image to be converted is obtained by obtaining the reference vectors from the image to be converted. However, an image other than the multi-spectral image to be converted may also be used for the statistical processing, or a plurality of images may also be used for the statistical processing.

In step S121, the reference vector setting unit 22 extracts a plurality of sample pixels from the multi-spectral image acquired in step S120. The number of sample pixels is arbitrary, but it is preferable to extract at least tens to hundreds of pixels to ensure the precision of the statistical processing. Alternatively, all the pixels of the multi-spectral image may be used as sample pixels. The upper part of FIG. 13 schematically shows the distribution of the extracted sample pixel group (actually, the distribution is in an N-dimensional space (N>3), but it is represented in a three-dimensional space for convenience of illustration).

In step S122, the reference vector setting unit 22 performs principal component analysis on the distribution of the sample pixel group in the N-dimensional space, and obtains a first principal component, a second principal component, and a third principal component. Then, in step S123, the reference vector setting unit 22 sets the first principal component, the second principal component, and the third principal component as the reference vectors V1, V2, and V3, respectively. Here, the reference vectors V1, V2, and V3 are unit vectors. An example of the reference vector is shown in the lower part of FIG. 13.

This method enables automatic setting of a reference vector which is suitable for expressing the distribution of the sample pixel group. By using this reference vector to convert a multi-spectral image, a 3-channel image can be obtained in which characteristic image information included in the multi-spectral image is extracted or emphasized.

(7) Automatic Setting of Reference Vector by Statistical Processing (Discrimination Between Two Categories)

FIG. 14 is a flowchart showing another example of an automatic setting method of reference vectors by statistical processing. In this example, a method of using discriminant analysis as the statistical processing to generate a reference vector for conversion into a 3-channel image suitable for identifying a non-defective product and a defective product is described.

In step S140, the reference vector setting unit 22 acquires a multi-spectral image used for the statistical processing. For example, it is preferable to use a plurality of non-defective product images and a plurality of defective product images prepared in advance to learn the image features of the non-defective products and the defective products.

In step S141, the reference vector setting unit 22 extracts a plurality of sample pixels belonging to a first category from the multi-spectral image acquired in step S140. Here, non-defective products are classified into the first category, and defective products are classified into a second category. Therefore, in step S141, a sample pixel group of the first category is extracted from the plurality of non-defective images.

In step S142, the reference vector setting unit 22 extracts a plurality of sample pixels belonging to the second category from the multi-spectral image acquired in step S140. Here, a sample pixel group of the second category is extracted from the plurality of defective image images. The upper part of FIG. 15 schematically shows the distribution of the extracted sample pixel groups (actually, the distribution is in an N-dimensional space (N>3), but it is represented in a two-dimensional space for convenience of illustration).

In step S143, the reference vector setting unit 22 performs discriminant analysis on the distribution of the sample pixel group in the N-dimensional space, and obtains a discrimination boundary DS between the first category and the second category. The discrimination boundary DS is a hyperplane. Then, in step S144, the reference vector setting unit 22 determines the reference vector V1 so as to make it orthogonal to the discrimination boundary DS, and further determines the other reference vectors V2 and V3 so as to make them orthogonal to the reference vector V1. Moreover, the reference vectors V2 and V3 may also be set so as to be orthogonal to each other. An example of setting the reference vectors V1 and V2 is schematically shown in the lower part of FIG. 15.

By converting the multi-spectral image using the reference vector determined as above, a 3-channel image can be obtained in which the difference between the image features of the two categories (the difference between the non-defective product and the defective product in this example) is emphasized. Therefore, by using such a 3-channel image, a simple and highly-precise product inspection can be realized.

Moreover, in this example, identification of a non-defective product and a defective product is taken as an example, and various applications are possible depending on how the sample pixel groups of the first category and the second category are given. For example, if the pixel group extracted from the subject area in the multi-spectral image is set as the sample pixel group of the first category and the pixel group extracted from the background area is set as the sample pixel group of the second category, a 3-channel image that facilitates segmentation of the subject (foreground) and the background can be obtained. In addition, if the sample pixels of the first category are extracted from the image of an A-rank product and the sample pixels of the second category are extracted from the image of a B-rank product, a 3-channel image suitable for grading products can be obtained.

(8) Automatic Setting of Reference Vector by Statistical Processing (Discrimination of Three Categories)

FIG. 16 shows another example of an automatic setting method of reference vectors by statistical processing. In this example, a method of using discriminant analysis as the statistical processing to generate a reference vector for conversion into a 3-channel image suitable for identifying three categories is described.

The reference vector setting unit 22 extracts, for example, a sample pixel group of the first category (A-rank product), a sample pixel group of the second category (B-rank product), and a sample pixel group of the third category (C-rank product) from the image of an A-rank product, the image of a B-rank product, and the image of a C-rank product. FIG. 16 schematically shows distribution of the sample pixel groups of the first to third categories (actually, the distribution is in an N-dimensional space (N>3), but it is represented in a two-dimensional space for convenience of illustration).

The reference vector setting unit 22 performs discriminant analysis on the distribution of the sample pixel group in the N-dimensional space, and obtains a discrimination boundary DS1 of the first category and the second category, a discrimination boundary DS2 of the second category and the third category, and a discrimination boundary DS3 of the first category and the third category. The discrimination boundaries DS1 to DS3 are all hyperplanes. Then, the reference vector setting unit 22 determines the reference vector V1 so as to make it orthogonal to the discrimination boundary DS1, determines the reference vector V2 so as to make it orthogonal to the discrimination boundary DS2, and determines the reference vector V3 so as to make it orthogonal to the discrimination boundary DS3.

By converting the multi-spectral image using the reference vector determined as above, a 3-channel image can be obtained in which the difference in the image features of the three categories (difference in grades A to C in this example) is emphasized. Therefore, simple and highly-precise grading can be realized by using such a 3-channel image.

<Others>

The embodiment described above merely exemplarily illustrates the configuration of the present invention. The present invention is not limited to the above-mentioned specific embodiment, and various modifications can be made within the scope of the technical ideas of the present invention. For example, although a 16-band multi-spectral image is used in the above embodiment, the number of bands may be any number as long as it is 4 or more. In addition, the image processing device 1 may directly save the multi-spectral image as raw data without converting it into a 3-channel image. Besides, the user interface in FIG. 5 is merely an example, and any user interface may be used as long as parameters that define the shape of the reference vector can be input.

APPENDIX (1) An image processing device (1) comprising:
an image input part (21) for inputting a multi-spectral image (10) which includes N (N is an integer of 4 or more) channels corresponding to N bands;
a reference vector setting part (22) for causing a user to set, as three reference vectors (V1, V2, V3), three types of N-dimensional vectors having sensitivities of the respective N bands as elements; and
a conversion part (23) for converting the multi-spectral image (10) into a 3-channel image (11) including three channels by decomposing a spectral distribution of each pixel of the multi-spectral image (10) on the basis of the three reference vectors (V1, V2, V3).

(2) An image processing device (1) including:
an image input part (21) for inputting a multi-spectral image (10) which comprises N (N is an integer of 4 or more) channels corresponding to N bands;
a reference vector setting part (22) for setting, as three reference vectors (V1, V2, V3), three types of N-dimensional vectors having sensitivities of the respective N bands as elements; and
a conversion part (23) for converting the multi-spectral image (10) into a 3-channel image (11) including three channels by decomposing a spectral distribution of each pixel of the multi-spectral image (10) on the basis of the three reference vectors (V1, V2, V3),
wherein the reference vector setting part (22) extracts a plurality of sample pixels from one or more multi-spectral images, and obtains the three reference vectors (V1, V2, V3) by statistical processing based on the distribution of the plurality of sample pixels in an N-dimensional space.

What is claimed is:

1. An image processing device comprising:
a processor configured to:
input a multi-spectral image which comprises N (N is an integer of 4 or more) channels corresponding to N bands;
cause a user to set, as three reference vectors, three types of N-dimensional vectors, each of the three types of N-dimensional vectors having sensitivities of the respective N bands as elements; and
convert the multi-spectral image into a 3-channel image comprising three channels by decomposing a spectral distribution of each pixel of the multi-spectral image on the basis of the three reference vectors, wherein the decomposing comprises calculating inner product of the spectral distribution of each pixel of the multi-spectral image and the respective reference vector.

2. The image processing device according to claim 1, wherein the processor is configured to display the reference vectors by a sensitivity curve representing sensitivities at each wavelength in a graph representing wavelength on the horizontal axis and sensitivity on the vertical axis, and cause a user to input parameters that define the shape of the sensitivity curve.

3. The image processing device according to claim 2, wherein the processor is configured to display the sensitivity curve as a symmetrical distribution curve, and the parameters that define the shape of the sensitivity curve comprise a mean of distribution, a height of distribution, and spread of distribution.

4. The image processing device according to claim 2, wherein the processor is configured to superimpose and display three reference vectors on a screen that displays spectral distribution of a first pixel and spectral distribution of a second pixel in a comparative manner.

5. The image processing device according to claim 4, wherein the processor is configured to extract three wavelengths having a large difference between the spectral distribution of the first pixel and the spectral distribution of the second pixel, create three reference vector candidates according to the extracted three wavelengths, and recommend the candidates to the user.

6. The image processing device according to claim 4, wherein the processor is configured to create three reference vector candidates so that the difference between a value of the converted pixel obtained by decomposing the spectral distribution of the first pixel on the basis of the three reference vectors and a value of the converted pixel obtained by decomposing the spectral distribution of the second pixel on the basis of the three reference vectors is maximized, and recommend the candidates to the user.

7. The image processing device according to claim 1, wherein the processor is configured to automatically change, in accordance with change of any of the three reference vectors by the user, the reference vectors other than the changed reference vector so that the three reference vectors satisfy a predetermined constraint.

8. The image processing device according to claim 7, wherein the predetermined constraint is a constraint that the three reference vectors are orthogonal to each other.

9. An image processing device comprising:
a processor configured to:
input a multi-spectral image which comprises N (N is an integer of 4 or more) channels corresponding to N bands;
set, as three reference vectors, three types of N-dimensional vectors, each of the three types of N-dimensional vectors having sensitivities of the respective N bands as elements; and
convert the multi-spectral image into a 3-channel image comprising three channels by decomposing a spectral distribution of each pixel of the multi-spectral image on the basis of the three reference vectors, wherein the decomposing comprises calculating inner product of the spectral distribution of each pixel of the multi-spectral image and the respective reference vector, wherein the processor is configured to extract a plurality of sample pixels from one or more multi-spectral images, and obtain the three reference vectors by statistical processing based on the distribution of the plurality of sample pixels in an N-dimensional space.

10. The image processing device according to claim 9, wherein the processor is configured to obtain a first principal component, a second principal component, and a third principal component by principal component analysis, based on the distribution of the plurality of sample pixels in the N-dimensional space, and set the first to third principal components as the three reference vectors.

11. The image processing device according to claim 9, wherein when the plurality of sample pixels are pixel groups to be classified into two categories, the processor is configured to obtain a discrimination boundary of the two categories by discriminant analysis based on the distribution of the plurality of sample pixels in the N-dimensional space, determine one reference vector so as to make it orthogonal to the discrimination boundary, and determine the other two reference vectors so as to make them orthogonal to the one reference vector.

12. The image processing device according to claim 9, wherein when the plurality of sample pixels are pixel groups to be classified into three categories, the processor is configured to obtain a discrimination boundary of a first category and a second category, a discrimination boundary of the second category and a third category, and a discrimination boundary of the third category and the first category respectively by discriminant analysis, based on the distribution of the plurality of sample pixels in the N-dimensional space, and determine the three reference vectors so as to make them orthogonal to the three discrimination boundaries respectively.

13. The image processing device according to claim 1, wherein the processor is configured to output the converted 3-channel image as data in the form of an RGB image.

14. The image processing device according to claim 13, wherein among three channels of the converted 3-channel image, the processor is configured to allocate the channel corresponding to the longest wavelength to an R channel, the channel corresponding to the second longest wavelength to a G channel, and the channel corresponding to the shortest wavelength to a B channel, respectively.

15. The image processing device according to claim 1, wherein the processor is configured to obtain the value of each pixel of the 3-channel image by calculating the inner product of the spectral distribution of each pixel of the multi-spectral image and each reference vector.

16. An image sensor comprising:
a multispectral camera capable of outputting a multi-spectral image which comprises N (N is an integer of 4 or more) channels corresponding to N bands, and
the image processing device according to claim 1, which converts the multi-spectral image output from the multispectral camera into a 3-channel image.

17. An image processing method comprising:
a step of inputting a multi-spectral image which comprises N (N is an integer of 4 or more) channels corresponding to N bands,
a step of causing a user to set, as three reference vectors, three types of N-dimensional vectors, each of the three types of N-dimensional vectors having sensitivities of the respective N bands as elements, and
a step of converting the multi-spectral image into a 3-channel image comprising three channels by decomposing a spectral distribution of each pixel of the multi-spectral image on the basis of the three reference vectors, wherein the decomposing comprises calculating inner product of the spectral distribution of each pixel of the multi-spectral image and the respective reference vector.

18. An image processing method comprising:
a step of inputting a multi-spectral image which comprises N (N is an integer of 4 or more) channels corresponding to N bands,
a step of setting, as three reference vectors, three types of N-dimensional vectors, each of the three types of N-dimensional vectors having sensitivities of the respective N bands as elements, and
a step of converting the multi-spectral image into a 3-channel image comprising three channels by decomposing a spectral distribution of each pixel of the multi-spectral image on the basis of the three reference vectors, wherein the decomposing comprises calculating inner product of the spectral distribution of each pixel of the multi-spectral image and the respective reference vector,
wherein in the step of setting the reference vectors, a plurality of sample pixels are extracted frons one or more multi-spectral images, and the three reference vectors are obtained by statistical processing based on the distribution of the plurality of sample pixels in an N-dimensional space.

19. A non-transitory computer readable recording medium storing a program for causing a processor to execute each step of the image processing method according to claim 17.

* * * * *